(12) United States Patent
Sircar et al.

(10) Patent No.: US 11,703,815 B2
(45) Date of Patent: Jul. 18, 2023

(54) BUILDING CONTROL SYSTEM WITH PREDICTIVE MAINTENANCE BASED ON TIME SERIES ANALYSIS

(71) Applicant: Johnson Controls Tyco IP Holdings LLP, Milwaukee, WI (US)

(72) Inventors: Ovijeet Sircar, West Bengal (IN); Tushar S. Joshi, Maharashtra (IN); Anil Tribhuwan, Maharashtra (IN); Sourav Bandyopadhyay, West Bengal (IN); Sikim Chakraborty, West Bengal (IN)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 304 days.

(21) Appl. No.: 16/034,057

(22) Filed: Jul. 12, 2018

(65) Prior Publication Data
US 2020/0019129 A1    Jan. 16, 2020

(51) Int. Cl.
G05B 13/04    (2006.01)

(52) U.S. Cl.
CPC .................................. *G05B 13/048* (2013.01)

(58) Field of Classification Search
CPC ............. G05B 13/048; G05B 23/0254; G05B 23/0283; G06Q 50/06; G06Q 10/20
USPC ............................................................ 703/2
See application file for complete search history.

(56) References Cited

U.S. PATENT DOCUMENTS

| 10,762,475 | B2 | 9/2020 | Song et al. |
| 2015/0316907 | A1* | 11/2015 | Elbsat .................... G05B 15/02 700/275 |
| 2016/0180220 | A1* | 6/2016 | Boettcher ............ G05B 19/042 700/276 |
| 2017/0011312 | A1 | 1/2017 | Subramanian et al. |
| 2017/0091870 | A1 | 3/2017 | Trainor et al. |
| 2017/0293293 | A1 | 10/2017 | Brownie et al. |
| 2017/0295058 | A1 | 10/2017 | Gottschalk et al. |
| 2017/0351787 | A1 | 12/2017 | Kapuschat et al. |
| 2017/0366414 | A1 | 12/2017 | Hamilton et al. |
| 2018/0046164 | A1* | 2/2018 | Drees ................... G05B 19/409 |
| 2018/0113482 | A1* | 4/2018 | Vitullo ............... G05D 23/1917 |

OTHER PUBLICATIONS

Lv, J., Li, X., Anh, T.Q., and Li, T., A new algorithm for network traffic prediction, (2006), Proceedings of the 11th IEEE Symposium on Computers and Communications, pp. 1-6 (Year: 2006).*

(Continued)

*Primary Examiner* — Bijan Mapar
(74) *Attorney, Agent, or Firm* — Foley & Lardner LLP

(57) ABSTRACT

Systems and methods for operating an energy plant are disclosed herein. A time series of performance variable associated with a device in the energy plant is obtained. An auto-correlation function data of the device is obtained based on the time series of the performance variable associated with the device. An electronic model of the device is generated based on the auto-correlation function data. Time, at which a future event of the device is predicted to occur, is predicted based on the electronic model. A report indicating the future event of the device and the predicted time may be generated. The device may be automatically configured, according to the future event and the predicted time.

18 Claims, 7 Drawing Sheets

(56) References Cited

OTHER PUBLICATIONS

Flores, J. H. F., Engel, P. M., & Pinto, R. C. (Jun. 2012). Autocorrelation and partial autocorrelation functions to improve neural networks models on univariate time series forecasting. In The 2012 International Joint Conference on Neural Networks (IJCNN) (pp. 1-8). IEEE. (Year: 2012).*

Feng, C., Cui, M., Hodge, B. M., & Zhang, J. (2017). A data-driven multi-model methodology with deep feature selection for short-term wind forecasting. Applied Energy, 190, 1245-1257. (Year: 2017).*

U.S. Appl. No. 15/895,836, filed Feb. 13, 2018, Johnson Controls Technology Company.

U.S. Appl. No. 15/968,187, filed May 1, 2018, Johnson Controls Technology Company.

U.S. Appl. No. 16/014,556, filed Jun. 21, 2018, Johnson Controls Technology Company.

* cited by examiner

BUILDING CONTROL SYSTEM WITH PREDICTIVE MAINTENANCE BASED ON TIME SERIES ANALYSIS

BACKGROUND

The present disclosure relates generally to the operation of a central plant for serving building thermal energy loads. The present disclosure relates more particularly to systems and methods for predicting maintenance of the central plant.

A heating, ventilation and air conditioning (HVAC) system (also referred to as "a central plant" or "an energy plant" herein) may include various types of equipment configured to serve the thermal energy loads of a building or building campus. For example, a central plant may include HVAC devices such as heaters, chillers, heat recovery chillers, cooling towers, or other types of equipment configured to provide heating or cooling for the building. Some central plants include thermal energy storage configured to store the thermal energy produced by the central plant for later use.

Operating and maintaining the HVAC system include a facility engineer confirming states of various HVAC devices and modifying setpoints or configurations of one or more HVAC devices. However, a facility engineer confirming HVAC devices in a large HVAC system involves a time consuming and manually laborious process. Moreover, a facility engineer may not be available when one or more HVAC devices fail, rendering the entire HVAC system inoperable until the facility engineer becomes available.

SUMMARY

Various embodiments disclosed herein are related to a controller for an energy plant. The controller includes a data collector coupled to a device of the energy plant. The data collector is configured to obtain a time series of performance variable associated with the device. The data collector is also configured to obtain an auto-correlation function data of the device based on the time series of the performance variable associated with the device. The controller further includes a model generator coupled to the data collector. The model generator is configured to generate an electronic model of the device based on the auto-correlation function data. The controller further includes a predictor coupled to the data collector. The predictor is configured to predict a first time, at which a future event of the device is predicted to occur, based on the electronic model.

In one or more embodiments, the future event is of the performance variable associated with the device reaching a predetermined threshold.

In one or more embodiments, the predictor is configured to predict, at a second time, the first time, at which the future event of the device is predicted to occur, the first time after the second time.

In one or more embodiments, the data collector is further configured to obtain a partial auto-correlation function data of the device based on the auto-correlation function data of the device.

In one or more embodiments, the auto-correlation function data indicates a correlation between the time series of the device and a lagged time series of the device, and the partial auto-correlation function data indicates a correlation between the time series of the device and the lagged time series without a contribution from intervening samples between the time series and the lagged time series.

In one or more embodiments, the model generator is configured to generate the electronic model of the energy plant based on the auto-correlation function data and the partial auto-correlation function data of the device. The predictor may be configured to predict the first time, at which the future event of the device is predicted to occur, by modifying the electronic model based on the auto-correlation function data and the partial auto-correlation function data of the device. The model generator may be configured to modify parameters of the electronic model to be statistically significant and uncorrelated based on the auto-correlation function data and the partial auto-correlation function data of the device.

In one or more embodiments, the model generator is configured to modify parameters of the electronic model to be statistically significant and uncorrelated based on the auto-correlation function data of the device.

In one or more embodiments, the controller further includes a stationary data processor coupled to the data collector. The stationary data processor may be configured to determine a stationarity of the auto-correlation function data of the device based on the partial auto-correlation function data of the device. In response to determining that the stationarity of the auto-correlation function data of the device is less than a predetermined threshold, the stationary data processor may perform differencing on the time series of the performance variable associated with the device to modify the auto-correlation function data and the partial auto-correlation function data of the device. The model generator may be configured to obtain the electronic model based on the differenced operation on the auto-correlation function data of the device.

In one or more embodiments, the stationary data processor is further configured to detect a pattern of the time series of the performance variable associated with the device based on the auto-correlation function data and the partial auto-correlation function data. The stationary data process may be further configured to remove the detected pattern from the time series of the performance variable associated with the device to modify the auto-correlation function data and the partial auto-correlation function data.

In one or more embodiments, the model generator is configured to determine whether the auto-correlation function data has a slope less than a predetermined threshold. In response to determining that the auto-correlation function data has the slope less than the predetermined threshold, the model generator may add a moving average corresponding to the slope of the auto-correlation function data to the electronic model.

In one or more embodiments, the model generator may be configured to determine whether the partial auto-correlation function data has a slope less than a predetermined threshold. In response to determining that the partial auto-correlation function data has the slope less than the predetermined threshold, the model generator may add an auto-regressive term corresponding to the slope of the partial auto-correlation function data to the electronic model.

In one or more embodiments, the controller further includes a model evaluator coupled to the predictor. The model evaluator may be configured to compare the future event and an actual event of the device to evaluate an accuracy of the model.

In one or more embodiments, the controller further includes a report generator coupled to the predictor. The report generator may be configured to generate a report indicating the future event of the device and the first time, at which the future event is predicted to occur.

In one or more embodiments, the controller further includes a device controller coupled to the predictor and the device. The device controller may be configured to automatically configure the device according to the future event and the first time, at which the future event is predicted to occur.

Various embodiments disclosed herein are related to a method of operating an energy plant. The method includes obtaining a time series of performance variable associated with a device in the energy plant. The method further includes obtaining an auto-correlation function data of the device based on the time series of the performance variable associated with the device. The method further includes predicting a first time, at which a future event of the device is predicted to occur, based on the auto-correlation function data of the device.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Referring generally to the FIGURES, disclosed herein are systems and methods for distributing thermal energy loads of an energy plant, and operating the energy plant accordingly.

Various embodiments disclosed herein are related to a system, a method, and a non-transitory computer readable medium including instructions for operating an energy plant by predicting time, at which a predicted future event of a device of the energy plant. A future event of a device is any event of the device expected to occur. Examples of the future event of a device include a status of the device reaching a threshold capacity, scheduled maintenance, etc.

In one aspect, a time series of performance variable associated with a device of the energy plant is obtained, and an auto-correlation function data and a partial auto-correlation function data of the device are obtained based on the time series of the performance variable associated with the device. Performance variable associated with a device indicates a status of the device. Examples of the performance variable include temperature measurements, pressure measurements, flow rate measurements, voltage measurements, etc. The auto-correlation function data indicates a correlation between the time series of the performance variable associated with the device and a lagged time series of the performance variable associated with the device. The partial auto-correlation function data indicates a correlation between the time series of the device and the lagged time series without a contribution from intervening samples between the time series and the lagged time series. Based on the auto-correlation function data and the partial auto-correlation function data of the device, time, at which a future event of the device is predicted to occur, can be predicted. For example, Auto Regressive Integrated Moving Average (ARIMA) model for predicting future events and time, at which the event of the device is predicted to occur, can be generated based on the auto-correlation function data and the partial auto-correlation function data of the device.

Advantageously, a report indicating the predicted future event of the device and time, at which the predicted future event is predicted to occur, may be generated. For example, a report indicates when a device will likely reach its maximum capacity or when a field engineer should check a particular device for maintenance. Based on the report, a field engineer can be prepared to check or modify a device without missing a critical event. Additionally or alternatively, the device of the energy plant may be automatically configured according to the predicted future event and time, at which the future event is predicted to occur.

Building and HVAC System

Figure 1:
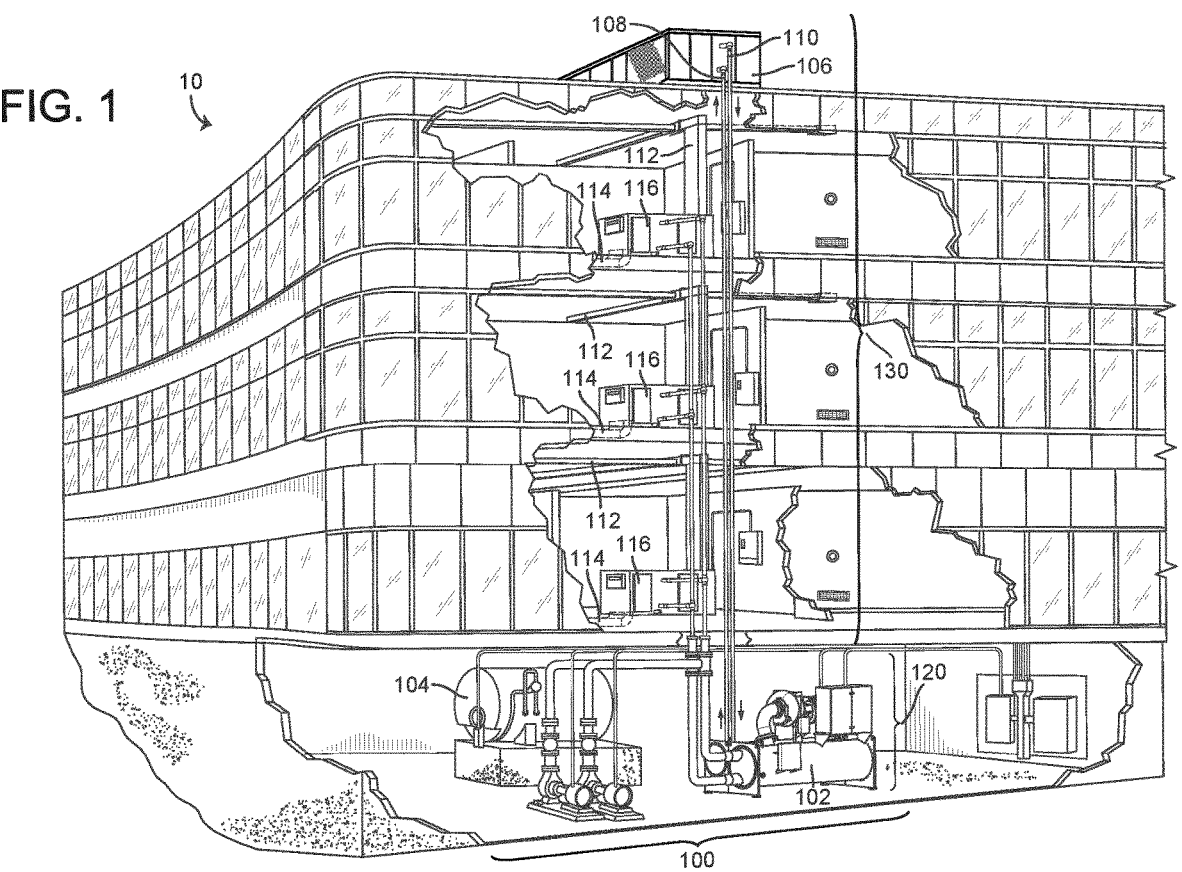
FIG. 1 is a drawing of a building equipped with an HVAC system, according to some embodiments.
Figure 2:
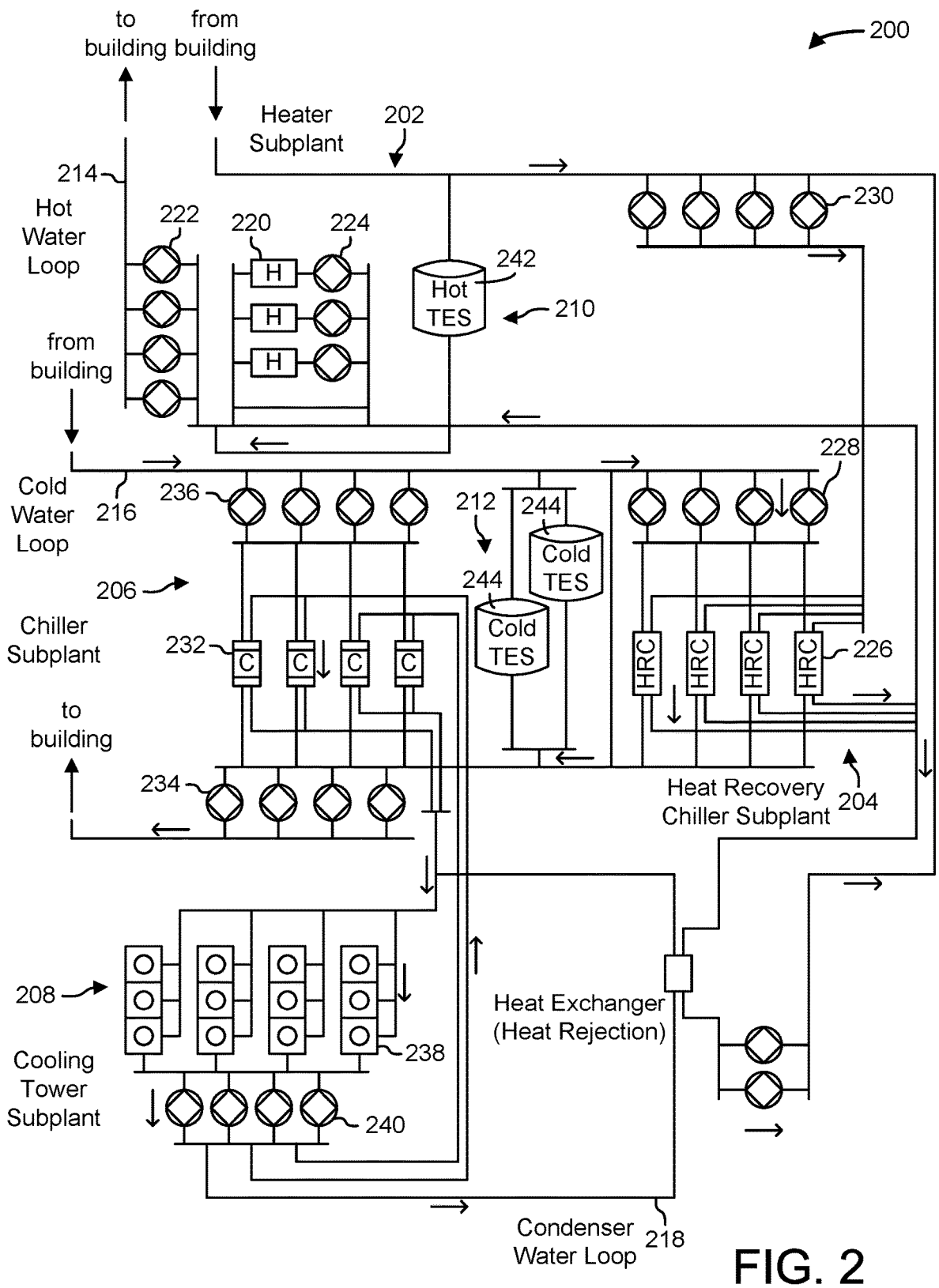
FIG. 2 is a schematic of a waterside system, which can be used as part of the HVAC system of FIG. 1, according to some embodiments.
Figure 3:
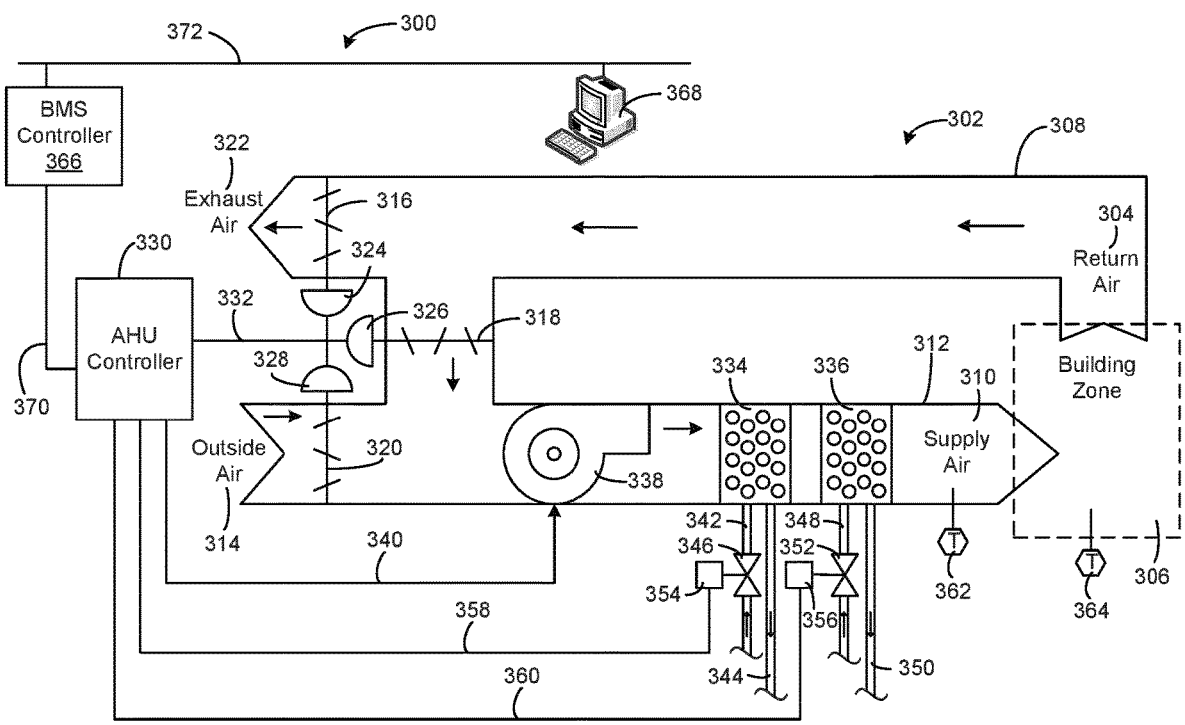
FIG. 3 is a block diagram illustrating an airside system, which can be used as part of the HVAC system of FIG. 1, according to some embodiments.

Referring now to FIGS. 1-3, an exemplary HVAC system in which the systems and methods of the present disclosure can be implemented are shown, according to an exemplary embodiment. While the systems and methods of the present disclosure are described primarily in the context of a building HVAC system, it should be understood that the control strategies described herein may be generally applicable to any type of control system.

Referring particularly to FIG. 1, a perspective view of a building 10 is shown. Building 10 is served by a building management system (BMS). A BMS is, in general, a system of devices configured to control, monitor, and manage equipment in or around a building or building area. A BMS can include, for example, an HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 and the building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment's configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive return air 304 and outside air 314. AHU 302 can be configured to operate an exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust air damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to AHU controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by heating coil 336 or cooling coil 334 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination thereof.

Still referring to FIG. 3, airside system 300 is shown to include a BMS controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. The AHU controller 330 may be a hardware module, a software module configured for execution by a processor of BMS controller 366, or both.

In some embodiments, AHU controller 330 receives information (e.g., commands, set points, operating boundaries, etc.) from BMS controller 366 and provides information (e.g., temperature measurements, valve or actuator positions, operating statuses, diagnostics, etc.) to BMS controller 366. For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Example Climate Control System

Figure 4:
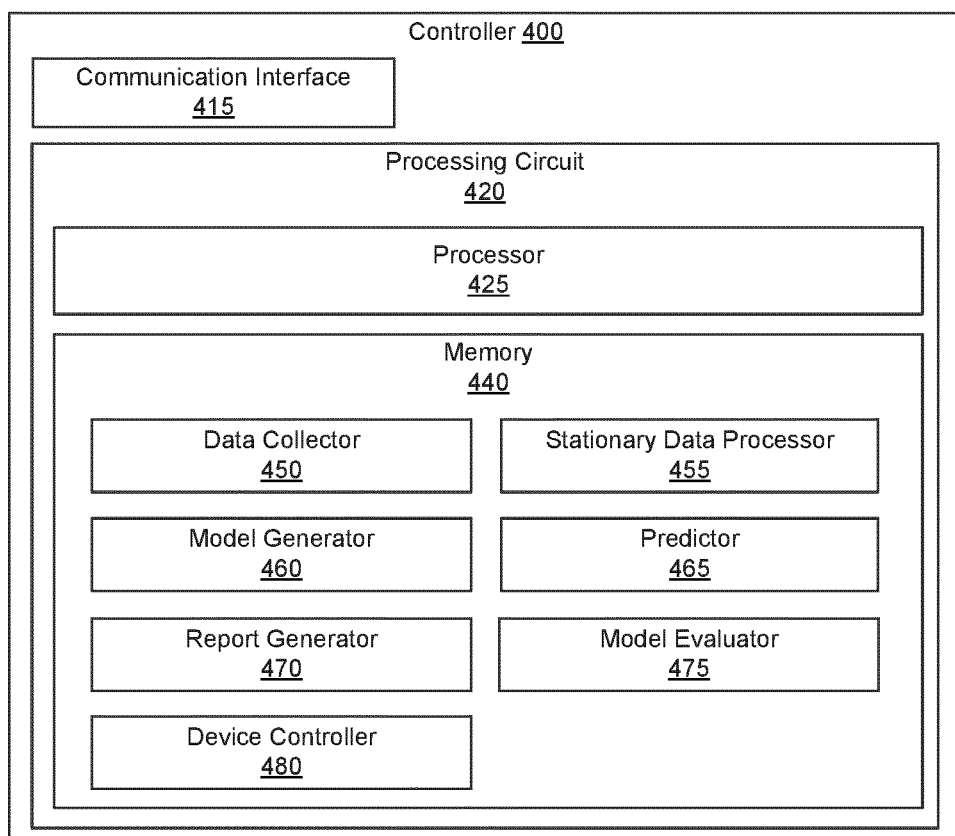
FIG. 4 is a block diagram of a central plant controller, according to some embodiments.

Referring to FIG. 4, illustrated is a block diagram of a central plant controller 400, according to some embodiments. In some embodiments, the central plant controller 400 is part of the HVAC system 100 of FIG. 1. Alternatively, the central plant controller 400 is coupled to the HVAC system 100 through a communication link. The central plant controller 400 may be the AHU controller 330 of FIG. 3, or a combination of the BMS controller 366 and the AHU controller 330 of FIG. 3. In one configuration, the central plant controller 400 includes a communication interface 415 and a processing circuit 420. These components operate together to predict a future event of a device and time, at which the event is predicted to occur. In some embodiments, the central plant controller 400 includes additional, fewer, or different components than shown in FIG. 4.

The communication interface 415 facilitates communication of the central plant controller 400 with other HVAC devices (e.g., heaters, chillers, air handling units, pumps, fans, thermal energy storage, etc.). The communication interface 415 can be or include wired or wireless communications interfaces (e.g., jacks, antennas, transmitters, receivers, transceivers, wire terminals, etc.). In various embodiments, communications via the communication interface 415 can be direct (e.g., local wired or wireless communications) or via a communications network (e.g., a WAN, the Internet, a cellular network, etc.). For example, the communication interface 415 can include an Ethernet/USB/RS232/RS485 card and port for sending and receiving data through a network. In another example, the communication interface 415 can include a Wi-Fi transceiver for communicating via a wireless communications network. In another example, the communication interface 415 can include cellular or mobile phone communication transceivers.

The processing circuit 420 is a hardware circuit executing instructions to predict future events of HVAC devices of the HVAC system 100 and time, at which the events are predicted to occur. In one embodiment, the processing circuit 420 includes a processor 425, and memory 440 storing instructions (or program code) executable by the processor 425. The memory 440 may be any non-transitory computer readable medium. In one embodiment, the instructions executed by the processor 425 cause the processor 425 to form software modules including a data collector 450, a stationary data processor 455, a model generator 460, a predictor 465, a report generator 470, a model evaluator 475, and a device controller 480. In other embodiments, the processor 425 and the memory 440 may be omitted, and the data collector 450, the stationary data processor 455, the model generator 460, the predictor 465, the report generator 470, the model evaluator 475, and the device controller 480 may be implemented as hardware modules by a reconfigurable circuit (e.g., field programmable gate array (FPGA)), an application specific integrated circuit (ASIC), or any circuitries, or a combination of software modules and hardware modules.

The data collector 450 is a component that obtains data for predicting future events of devices of an energy plant (e.g., HVAC system 100 of FIG. 1). The data collector 450 may be coupled to the devices of the energy plant. In one aspect, the data collector 450 obtains time series of devices of the energy plant. The data collector 450 may receive sensed performance variables associated with the devices of the energy plant, and store the sensed performance variables by the memory 440 as the time series. Time series may be derived based on other time series. For example, the data collector 450 may extrapolate or interpolate time series to obtain additional samples of the time series, and store the additional samples by the memory 440.

The data collector 450 also obtains auto-correlation function data and partial auto-correlation function data of devices based on the time series. The auto-correlation function data indicates a correlation between the time series of the device and a lagged time series of the device. The lagged time series of the device may be delayed by a predetermined number of samples (e.g., two samples), or by an adjustable number of samples. The partial auto-correlation function data indicates a correlation between the time series of the device and the lagged time series without a contribution from intervening samples between the time series and the lagged time series. The auto-correlation function data and the partial auto-correlation function data may be employed by the stationary data processor 455 and the model generator 460 as described below with respect to FIGS. 4 through 7B.

Figure 7A:
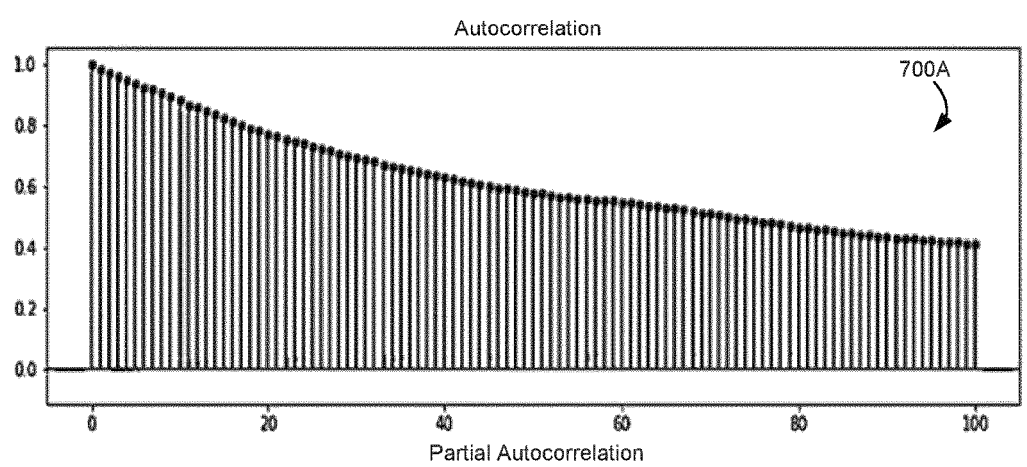
FIGS. 7A and 7B are examples of autocorrelation and partial autocorrelation for predicting time, at which a future event of HVAC system is predicted to occur, according to some embodiments.
Figure 7B:
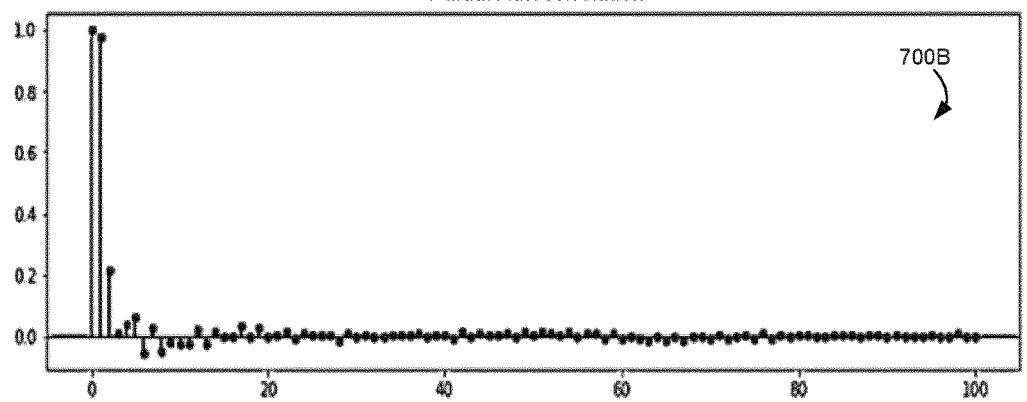

The stationary data processor 455 is a component that ensures the auto-correlation function data is stationary. The stationary data processor 455 may be coupled to the data collector 450. The stationary data processor 455 may determine a stationarity of the auto-correlation function data based on the partial auto-correlation function data. A stationarity indicates any trend, pattern, or seasonal structure in the auto-correlation data. For example, higher stationarity indicates fewer trends, fewer patterns, or less seasonal structures in the auto-correlation data. By ensuring high stationarity of the auto-correlation data, accuracy of the prediction of the future event and the time, at which the event is predicted to occur, can be improved. For example, as shown in FIG. 7A, auto-correlation function data 700A may include direct correlation (e.g., spike at lag 1) and indirect correlation (e.g., exponential decay). The stationary data processor 455 may remove the indirect correlation from the auto-correlation function data 700A to obtain the partial auto-correlation function data 700B as shown in FIG. 7B, such that direct correlation can be identified. Any trend, pattern, or seasonal structure in the auto-correlation data 700A can be determined based on the partial auto-correlation function data 700B or by comparing the auto-correlation data 700A and the partial auto-correlation function data 700B. Moreover, the stationary data processor 455 may determine a stationarity of the auto-correlation function data according to the determined trend, pattern, or seasonal structure in the auto-correlation data. If the stationarity is below a predetermined threshold, the stationary data processor 455 may perform differencing on the time series of the device to modify the auto-correlation function data and the partial-correlation function data. The stationary data processor 455 may compute a difference between two consecutive observations of the time series to perform differencing. Through differencing, a non-stationary time series may become stationary and a mean of the time series may be stabilized. In one aspect, the stationary data processor 455 detects a pattern of the time series based on the auto-correlation function data and the partial auto-correlation function data, and removes the detected pattern from the time series to modify the auto-correlation function data and the partial auto-correlation function data.

The model generator 460 is a component that obtains an electronic model for predicting a future event and time, at which the event is predicted to occur. The model generator 460 may be coupled to the data collector 450 and the predictor 465. A future event of a device is any event of the device expected to occur. Examples of the future event of a device include a status of the device reaching a threshold capacity, scheduled maintenance, etc. The model generator 460 may generate an electronic model based on the auto-correlation function data and the partial auto-correlation data. In one example, the model generator 460 generates auto-regressive (AR), integrated (I), moving average (MA), or ARIMA model based on the auto-correlation function data and the partial auto-correlation data.

In one aspect, the ARIMA model forecasting for a stationary time series is a linear (like a linear regression) equation. The prediction may depend on the parameters (p,d,q) of the ARIMA model. A number of AR (Auto-Regressive) terms (p) indicates lags of dependent variable. For example, if p is 5, the predictors for x(t) are x(t−1) . . . x(t−5). A number of MA (Moving Average) terms (q) indicates lagged forecast errors in prediction equation. For instance, if q is 5, the predictors for x(t) are e(t−1) . . . e(t−5), where e(i) is the difference between the moving average at ith instant and actual value. A number of differences (d) indicates the number of non-seasonal differences. Thus, either the model generator 460 can pass that variable and put d=0 or pass the original variable and put d=1. Both may generate same results. In one example, the model generator 460 obtains an electronic model as below:

If $MA(d)=0$, $y_t=Y_t$, and

If $MA(d)=1$, $y_t=Y_t-Y_{t-1}$

For $AR(p)=1$, $Y_t=pY_{(t-1)}+e_t$, $q=0$

For $MA(d)=1$, $Y_t=pY_{(t-1)}+e_t+de_{(t-1)}$ where $Y_t$ is actual (or predicted) value of performance variable at time t; $y_t$ is dth order difference; d is a moving average (MA) parameter; $p_t$ is auto regressive (AR) parameter; and $e_t$ is an error factor at time t (e.g., a difference between the moving average of the time series and the actual value).

In one aspect, the model generator 460 modifies the electronic model until the parameters of the electronic model are statistically significant and uncorrelated. For example, the model generator 460 determines whether p, d, q parameters of the ARIMA model are statistically significant based on Durbin Watson Statistics test (e.g., $\mu=0.0014$), or Ljung-Box test and Breusch-Godfrey test (e.g., $x^2=0.0034$). Ensuring the parameters of the electronic model are statistically significant and uncorrelated enables the accuracy of the prediction performed by the predictor 465 to be increased.

In one approach, the model generator 460 modifies the electronic model based on the auto-correlated function data. The model generator 460 may detect a point with a slope of the auto-correlation function data below a predetermined threshold rate as a cut-off point (e.g., lag−1). The model generator 460 may determine whether the auto-correlation function data has a steep cut off by determining whether the slope of the auto-correlation function data at the cut-off point is below a first threshold. If the auto-correlation function data has a steep cut off or if the slope of the auto-correlation function data at the cut-off point is below the first threshold, then the model generator 460 modifies the electronic model by adding a moving average (MA) term that is equal to the lag, at which the auto-correlation function data cuts off, to the electronic model. The model generator 460 may repeat the process of modifying the electronic model based on the auto-correlation function data, until the auto-correlation function data does not have a steep cut off or until the slope of the auto-correlation function data at the cut-off point is not below the first threshold.

In one approach, the model generator 460 modifies the electronic model based on the partial auto-correlated function data. The model generator 460 detects a point with a slope of the partial auto-correlation function data below a predetermined threshold rate as a cut-off point. The model generator 460 determines whether the partial auto-correlation function data has a steep cut off by determining whether the slope of the partial auto-correlation function data at the cut-off point is below a second threshold. If the partial auto-correlation function data has a steep cut off or if the slope of the partial auto-correlation function data at the cut-off point is below the second threshold, then the model generator 460 modifies the electronic model by adding an auto regressive (AR) term that is equal to the lag, at which the partial auto-correlation function data cuts off, to the electronic model. The model generator 460 may repeat the process of modifying the electronic model based on the partial auto-correlation function data, until the partial auto-correlation function data does not have a steep cut off or until the slope of the partial auto-correlation function data at the cut-off point is not below the second threshold.

The predictor 465 is a component that predicts any future event, and time, at which the event is predicted to occur based on the electronic model from the model generator 460. The predictor 465 may be coupled to the data collector 450, the model generator 460, the report generator 470, the model evaluator 475, and the device controller 480. A future event of a device is any event of the device expected to occur. Examples of the future event of a device include a status of the device reaching a threshold capacity, scheduled maintenance, etc. Based on the electronic model, the predictor 465 at a first time may determine a second time, at which an event is predicted to occur, where the second time is after the first time. Based on the prediction by the predictor 465, the report generator 470 may generate a report indicating predicted events of one or more devices in an energy plant and corresponding times of the predicted events. Such report may be provided to a mobile device accessible by a field engineer, such that the field engineer can be readily available at the predicted times for monitoring failures or maintaining devices in the energy plant. Additionally or alternatively, the device controller 480 automatically configures one or more devices or controls setpoints of the one or more devices at the predicted times.

The model evaluator 475 is a component that confirms an accuracy of the electronic model generated by the model generator 460. In one approach, the model evaluator 475 confirms whether predicted events occur at predicted times. If an accuracy of the electronic model is below a predetermined threshold, the model evaluator 475 may cause the model generator 460 to update its model to improve accuracy.

Figure 5:
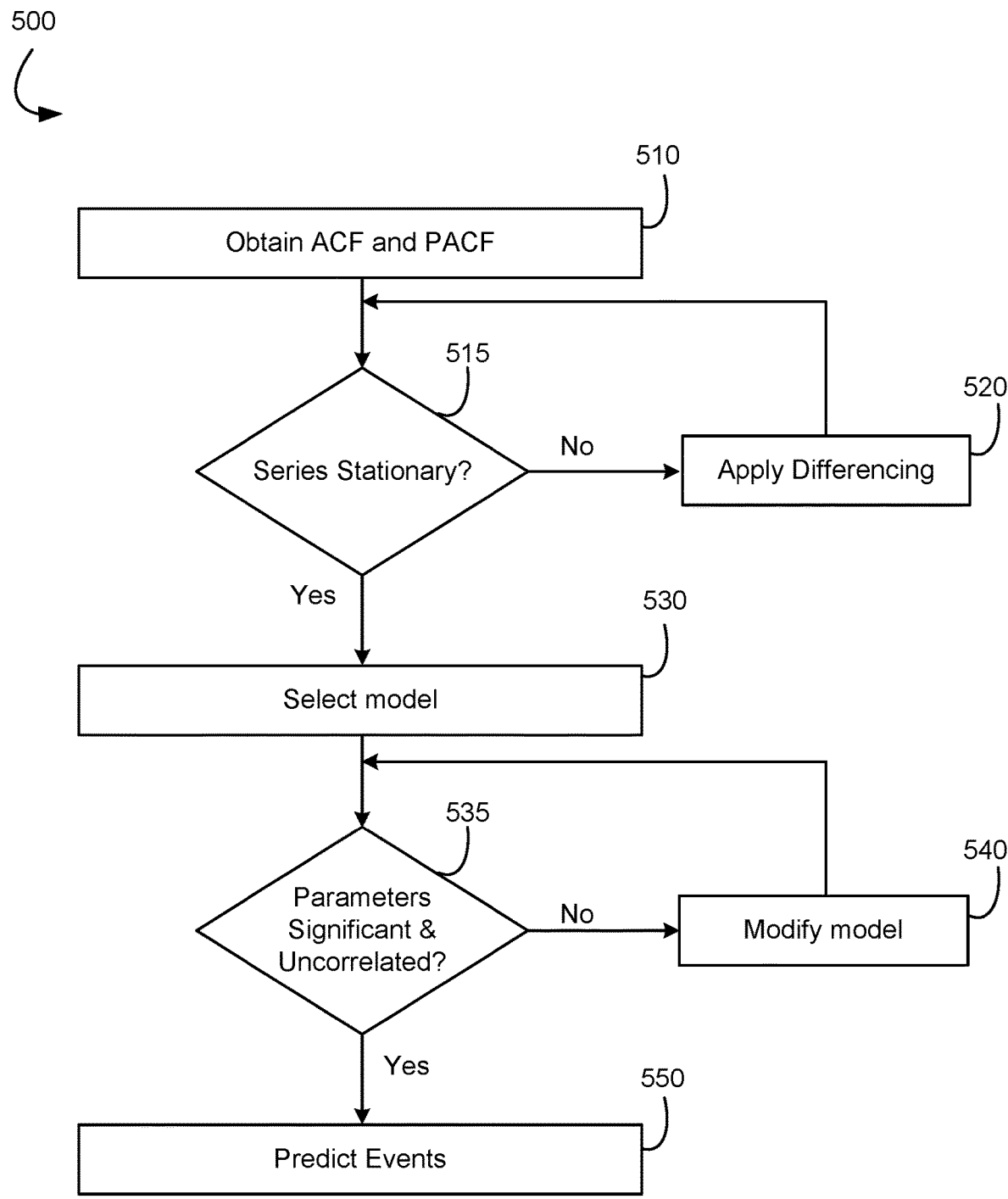
FIG. 5 is a flow chart illustrating a process for predicting time, at which a future event of HVAC system is predicted to occur, according to some embodiments.

FIG. 5 is a flow chart illustrating a process 500 for predicting time, at which a future event of HVAC system is predicted to occur, according to some embodiments. The process 500 may be performed by the central plant controller 400 of FIG. 4. In some embodiments, the process 500 may be performed by other entities. In some embodiments, the process 500 may include additional, fewer, or different steps than shown in FIG. 5.

The central plant controller 400 obtains auto-correlation function (ACF) data and partial auto-correlation function (PACF) data (step 510). The central plant controller 400 may obtain time series of a device of the HVAC system. The central plant controller 400 may obtain the auto-correlation function data and the partial auto-correlation function data based on the time series. The central plant controller 400 may obtain the auto-correlation function data by determining a correlation between the time series of the device and a lagged time series of the device. The central plant controller 400 may delay the time series by a predetermined number of samples (e.g., two samples), or by an adjustable number of samples to obtain the lagged time series. The central plant controller 400 may obtain the partial auto-correlation function data by determining a correlation between the time series of the device and the lagged time series without a contribution from intervening samples between the time series and the lagged time series.

The central plant controller 400 determines whether the auto-correlation function data is stationary or not (step 515). The central plant controller 400 may compare the auto-correlation function data and the partial auto-correlation function data, and detect whether any trend or a seasonable structure exists in the auto-correlation function data. The central plant controller 400 may determine a stationarity of the auto-correlation function data based on the detected trend or seasonable structure. In response to determining that the auto-correlated function data is stationary, the central plant controller 400 applies differencing on time series to update the auto-correlated function data and the partial auto-correlated function data (step 520). The central plant controller 400 may determine whether the stationarity is below a predetermined threshold, and apply differencing to modify the auto-correlation function data until the stationarity is below the predetermined threshold.

In response to determining that the auto-correlated function data is stationary, the central plant controller 400 selects an electronic model for predicting any event of a device of the HVAC system, and time, at which the event is predicted to occur (step 530). The central plant controller 400 may select parameters of ARIMA model. The central plant controller 400 determines whether the parameters are significant and uncorrelated (step 535). For example, the central plant controller 400 may apply statistical tests (e.g., Watson Statistics test (e.g., $\mu=0.0014$), or Ljung-Box test and Breusch-Godfrey test) on parameters to determine whether the parameters of the electronic model are statistically significant and uncorrelated. In response to determining that the parameters are not statistically significant and uncorrelated, the central plant controller 400 may modify the electronic model (step 540) until the parameters are statistically significant and uncorrelated.

In response to determining that the parameters of the electronic model are statistically significant and uncorrelated, the central plant controller 400 predicts events and time, at which the event is scheduled to occur based on the electronic model (step 550). Based on the prediction, the central plant controller may generate a report indicating predicted events of one or more devices in the HVAC system and corresponding times of the predicted events. Such report may be provided to a mobile device accessible by a field engineer, such that the field engineer can be readily available at the predicted times for monitoring failures or maintaining devices in the energy plant. Additionally or alternatively, the device controller 480 automatically configures one or more devices at the predicted times.

Figure 6:
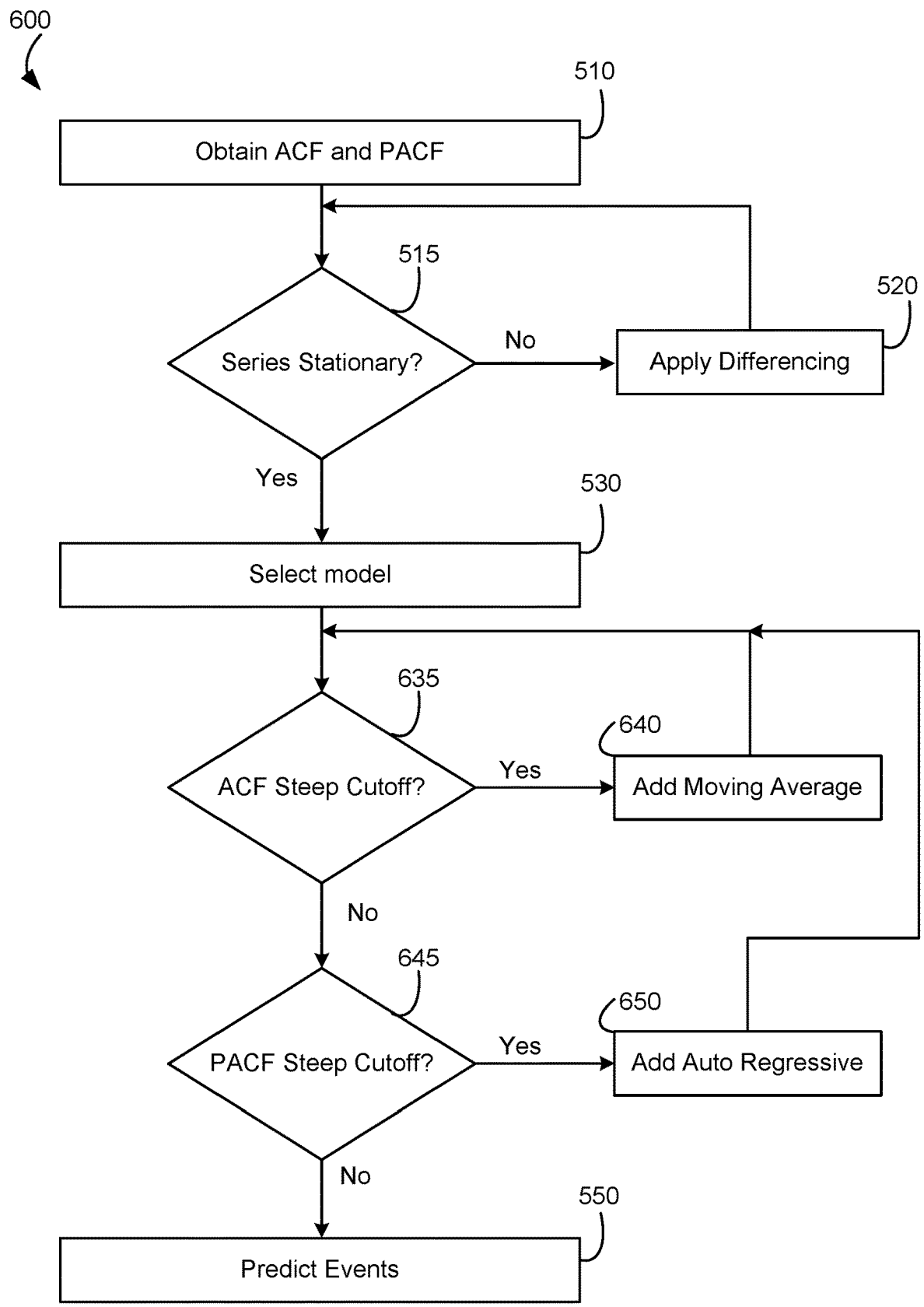
FIG. 6 is a flow chart illustrating another process for predicting time, at which a future event of HVAC system is predicted to occur, according to some embodiments.

FIG. 6 is a flow chart illustrating another process 600 for predicting time, at which a future event of HVAC system is predicted to occur, according to some embodiments. The process 600 may be performed by the central plant controller 400 of FIG. 4. The process 600 is substantially similar to the process 500 of FIG. 5, except the steps 535 and 540 are replaced with steps 635, 640, 645, 650. Thus, detailed description of duplicative portion is omitted herein for the sake of brevity. In other embodiments, the process 600 includes more, fewer, or different steps than shown in FIG. 6.

After the central plant controller 400 selects an electronic model for predicting events of a device in step 530, the central plant controller 400 detects a point with a slope of the auto-correlation function data below a predetermined threshold rate as a cut-off point. The central plant controller 400 determines whether the auto-correlation function data has a steep cut off by determining whether the slope of the auto-correlation function data at the cut-off point is below a first threshold (step 635). If the auto-correlation function data has a steep cut off or if the slope of the auto-correlation function data at the cut-off point is below the first threshold, then the central plant controller 400 modifies the electronic model by adding a moving average (MA) term that is equal to the lag, at which the auto-correlation function data cuts off, to the electronic model (step 640), then returns to the step 635. In one aspect, a steep cut off or a negative lag−1 autocorrelation in the auto-correlation function data of a differenced series indicates that the time series is over differenced. Hence, the central plant controller 400 may add the MA term to the electronic model to adjust the over differencing.

If the auto-correlation function data does not have a steep cut off or if the slope of the auto-correlation function data at the cut-off point is not below the first threshold in the step 635, the central plant controller 400 detects a point with a slope of the partial auto-correlation function data below a predetermined threshold rate as a cut-off point. The central plant controller 400 determines whether the partial auto-correlation function data has a steep cut off by determining whether the slope of the partial auto-correlation function data at the cut-off point is below a second threshold (step 645). If the partial auto-correlation function data has a steep cut off or if the slope of the partial auto-correlation function data at the cut-off point is below the second threshold, then the central plant controller 400 modifies the electronic model by adding an auto regressive (AR) term that is equal to the lag, at which the partial auto-correlation function data cuts off, to the electronic model (step 650), then returns to the step 635. In one aspect, a steep cut off or a positive lag−1 autocorrelation in the partial auto-correlation function data of a differenced series indicates that the time series is under differenced. Hence, the central plant controller 400 may add the AR term to the electronic model to adjust the under differencing.

If the partial auto-correlation function data does not have a steep cut off or if the slope of the partial auto-correlation function data at the cut-off point is not below the first threshold in the step 645, the central plant controller 400 predicts events and time, at which the event is scheduled to occur based on the electronic model (step 550).

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A controller for an energy plant, the controller comprising:
   a data collector coupled to a device of the energy plant, the data collector configured to:
      obtain a time series of a performance variable associated with the device;
      obtain an auto-correlation function data of the device based on the time series of the performance variable associated with the device;
      obtain a partial auto-correlation function data of the device based on at least one of the time series of the performance variable or the auto-correlation function data, the partial auto-correlation function data excluding a contribution of a portion of the samples considered in the auto-correlation function;
   a model generator coupled to the data collector, the model generator configured to generate an electronic model of the device using both the auto-correlation function data and the partial auto-correlation function data to select parameters of the electronic model and modify the parameters of the electronic model until the parameters are statistically significant and a slope of the auto-correlation function data or the partial auto-correlation function data satisfies a threshold criterion; and
   a predictor coupled to the data collector, the predictor configured to predict a first time, at which a future event of the device is predicted to occur, based on the electronic model.

2. The controller of claim 1, wherein the future event is the performance variable associated with the device reaching a predetermined threshold.

3. The controller of claim 1, wherein the predictor is configured to predict, at a second time, the first time, at which the future event of the device is predicted to occur, the first time after the second time.

4. The controller of claim 1, wherein:
   the auto-correlation function data indicates a correlation between the time series of the device and a lagged time series of the device, and
   the partial auto-correlation function data indicates a correlation between the time series of the device and the lagged time series without a contribution from intervening samples between the time series and the lagged time series.

5. The controller of claim 1,
wherein the model generator is configured to generate the electronic model of the device based on the auto-correlation function data and the partial auto-correlation function data of the device,
wherein the predictor is configured to predict the first time, at which the future event of the device is predicted to occur, based on the electronic model.

6. The controller of claim 5, further comprising a stationary data processor coupled to the data collector, the stationary data processor configured to:
determine a stationarity of the auto-correlation function data of the device based on the partial auto-correlation function data of the device; and
in response to determining that the stationarity of the auto-correlation function data of the device is less than a predetermined threshold, perform differencing on the time series of the performance variable associated with the device to modify the auto-correlation function data and the partial auto-correlation function data of the device,
wherein the model generator is configured to obtain the electronic model based on the differenced operating on the auto-correlation function data of the device.

7. The controller of claim 6, wherein the stationary data processor is further configured to:
detect a pattern of the time series of the performance variable associated with the device based on the auto-correlation function data and the partial auto-correlation function data; and
remove the detected pattern from the time series of the performance variable associated with the device to modify the auto-correlation function data and the partial auto- correlation function data of the device.

8. The controller of claim 5, wherein the slope is at a cut-off point of the auto-correlation function data and the model generator is configured to determine whether the slope satisfies the threshold criterion by:
determining whether the slope is less than a predetermined threshold; and
in response to determining that the auto-correlation function data has the slope less than the predetermined threshold at the cut-off point, adding a moving average corresponding to the cut-off point of the auto-correlation function data to the electronic model.

9. The controller of claim 5, wherein the slope is at a cut-off point of the partial auto-correlation function data and the model generator is configured to determine whether the slope satisfies the threshold criterion by:
determining whether the slope is less than a predetermined threshold; and
in response to determining that the partial auto-correlation function data has the slope less than the predetermined threshold at the cut-off point, adding an auto-regressive term corresponding to the cut-off point of the partial auto-correlation function data to the electronic model.

10. The controller of claim 1, further comprising:
a model evaluator coupled to the predictor, the model evaluator configured to compare the future event and an actual event of the device to evaluate an accuracy of the model.

11. The controller of claim 1, further comprising:
a report generator coupled to the predictor, the report generator configured to generate a report indicating the future event of the device and the first time, at which the future event is predicted to occur.

12. The controller of claim 1, further comprising:
a device controller coupled to the predictor and the device, the device controller configured to automatically configure the device according to the predicted future event and the first time, at which the predicted future event is predicted to occur.

13. A method for operating an energy plant, the method comprising:
obtaining a time series of performance variable associated with a device in the energy plant;
obtaining an auto-correlation function data of the device based on the time series of the performance variable associated with the device;
obtaining a partial auto-correlation function data of the device based on at least one of the time series of the performance variable or the auto-correlation function data, the partial auto-correlation function data excluding a contribution of a portion of the samples considered in the auto-correlation function;
generating an electronic model of the device using both the auto-correlation function data and the partial auto-correlation function data to select parameters of the electronic model and modify the parameters of the electronic model until the parameters are statistically significant and a slope of the auto-correlation function data or the partial auto-correlation function data satisfies a threshold criterion; and
predicting a first time, at which a future event of the device is predicted to occur, based on the electronic model.

14. The method of claim 13, wherein the future event is the performance variable associated with the device reaching a predetermined threshold.

15. The method of claim 13, wherein predicting the first time, at which the future event of the device is predicted to occur, comprises:
predicting at a second time, the first time, at which the future event of the device is predicted to occur, the first time after the second time.

16. The method of claim 13, further comprising:
wherein the auto-correlation function data indicates a correlation between the time series of the device and a lagged time series of the device, and
wherein the partial auto-correlation function data indicates a correlation between the time series of the device and the lagged time series without a contribution from intervening samples between the time series and the lagged time series.

17. The method of claim 16, further comprising:
generating the electronic model of the device based on the auto-correlation function data and the partial auto-correlation function data of the device,
wherein the first time, at which the future event of the device is predicted to occur, is predicted based on the electronic model.

18. The method of claim 17, further comprising:
determining a stationarity of the auto-correlation function data of the device based on the partial auto-correlation function data of the device; and
performing differencing on the time series of the performance variable associated with the device to modify the auto-correlation function data and the partial auto-correlation function data of the device, in response to determining that the stationarity of the auto-correlation function data of the device is less than a predetermined threshold, wherein the electronic model is obtained based on the differenced operating on the auto-correlation function data of the device.

\* \* \* \* \*